March 18, 1958  SHIH MOU LEE  2,827,090
SHREDDER

Filed Dec. 21, 1953  2 Sheets-Sheet 1

INVENTOR.
SHIH MOU LEE
BY
Mellin and Hanscom
ATTORNEYS

March 18, 1958  SHIH MOU LEE  2,827,090
SHREDDER

Filed Dec. 21, 1953  2 Sheets-Sheet 2

INVENTOR.
SHIH MOU LEE

BY

Mellen and Hanscom
ATTORNEYS

United States Patent Office 2,827,090
Patented Mar. 18, 1958

2,827,090

SHREDDER

Shih Mou Lee, Monterey, Calif.

Application December 21, 1953, Serial No. 399,375

1 Claim. (Cl. 146—78)

This invention relates to shredding machines, and particularly to a machine for shredding food products.

It is among the objects of this invention to provide a machine for cutting food products, and similar materials, into shreds.

Another object of the invention is to provide a machine provided with cutting blades, operable to cut directly through the material to be shredded in planes disposed at substantially right angles relative to each other, for producing clean cut shreds of the material, of desired size and length.

Another object is to provide a machine of the character described, operable for shredding materials of various kinds substantially uniformly with a minimum of waste.

It is also an object of the present invention to provide a machine for shredding materials in which the feeding and cutting action is developed to a relatively high power, with relatively low expenditure of energy.

The invention has other objects and features of advantage, some of which with the foregoing will be explained in the following description of that form of the invention illustrated in the drawings. It is to be understood that the invention is not limited to the embodiment shown in the drawings, as it may be embodied in other forms within the definition of the claim.

Figure 1:
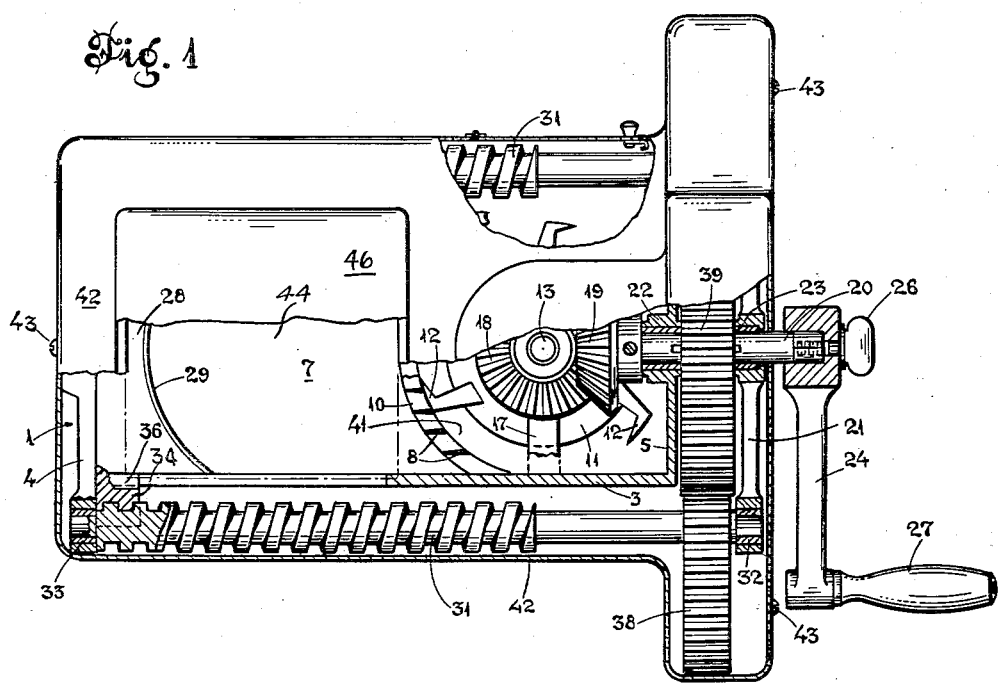
Fig. 1 is a plan view of a shredder embodying the present invention, parts being broken away, and parts being shown in section to more clearly illustrate the operative relationship of the parts.
Figure 2:
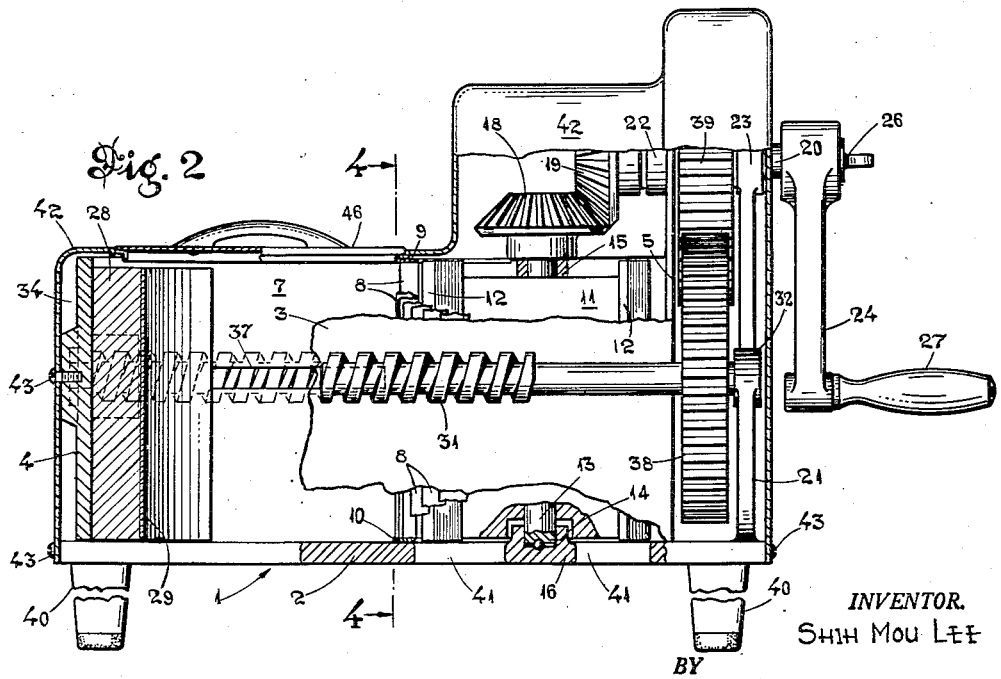
Fig. 2 is a side elevation of the device shown in Fig. 1, parts being broken away and shown in vertical section to more clearly illustrate the structure.
Figure 3:
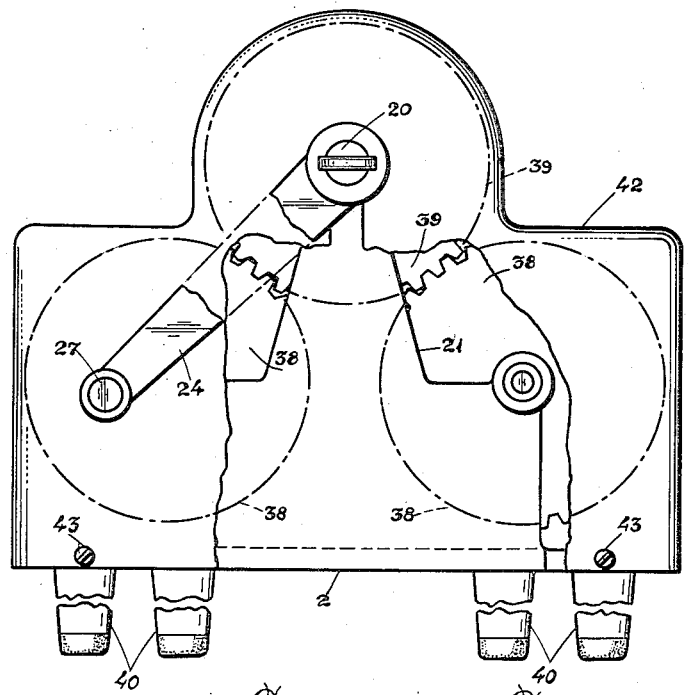
Fig. 3 is an end elevation of the device, portions being broken away to show underlying parts.
Figure 4:
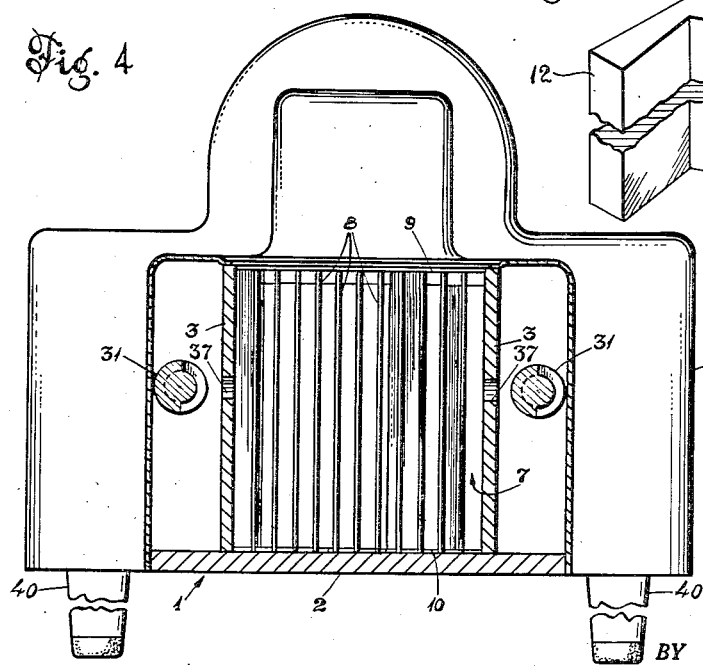
Fig. 4 is a transverse sectional view, the plan of the section being indicated by the line 4—4 of Fig. 2.
Figure 5:
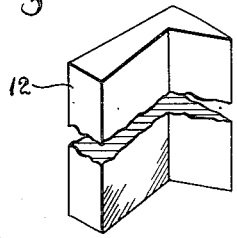
Fig. 5 is a fragmental perspective view of one of the cutter knives shown in Fig. 1.

In terms of broad inclusion, the shredder of the present invention comprises a chamber within which is mounted a plunger movable to press bulk material past a plurality of blades mounted in spaced parallel relation in an arcuate arrangement across the outlet end of the chamber. The blades are spaced to cut material pressed therepast into thin slices of a thickness varying in accordance with the spacing of the blades, and a rotary cutter is operable within the concave area immediately back of the blades to sever the slices into thin shreds of substantially uniform size. The invention contemplates the provision of a screw feed for the plunger, and gear actuated means for driving the plunger and the rotary cutter simultaneously at a rate and with a power factor adequate for ordinary purposes. The mechanism may be actuated by a hand crank, in small units designed for domestic or laboratory use; or by a motor, or other driving mechanism (not shown), in larger units operable on a commercial scale.

In terms of greater detail, the shredder of the present invention comprises a body designated in general by the numeral 1. The body includes a base plate 2, side walls 3, a rear wall 4, and a front wall 5, all of relatively heavy construction, as for example, cast iron or aluminum. The side and rear walls 3 and 4, together with the base plate 2, combine to form a chamber at one end of the body, the chamber being designated in general by the numeral 7. At a point axially spaced substantially from the rear wall 4, and marking the forward end of the chamber 7, is mounted a plurality of slicing blades 8, which extend in spaced parallel relation across the chamber 7. As illustrated, the blades 8 are vertically disposed between upper and lower mounting members 9 and 10 of arcuate shape, whereby the blades are held in arcuate arrangement with their sides parallel to the side walls 3, and with sharpened cutting edges directed toward the chamber 7.

Between the slicing blades 8 and the forward wall 5 is mounted a rotary cutter drum 11, provided with one or more cutter blades 12 movable by the drum along a path adjacent the backs of the slicing blade 8. Preferably the back edges of the slicing blades 8 are shaped to conform to the path of movement of the rotary cutter blades 12, so as to cooperate therewith to produce a shear action. The cutter drum 11 is secured to a shaft 13, journalled in bearings 14 and 15 carried by cross bars 16 and 17 respectively extending between the side walls 3 of the main body 1. A bevel gear 18 secured to the upper end of the drum shaft 13 meshes with a corresponding bevel gear 19 secured to a drive shaft 20. The shaft 20 is journalled in the front wall 5 and upon a journal bracket 21 by means of suitable bearings 22 and 23. The shaft 20 may be driven by any suitable motive power, as for example, a hand crank 24 secured to the outwardly extending end of the shaft 20. The crank 24 is removably held in operative position by a thumb nut, or other suitable securing means 26, and is provided with a handle 27 by which the shaft 20 may be turned. If desired, the drive shaft 20 may be motor driven in conventional manner, as by a motor (not shown) or other motive power of a character suitable for the type of service for which a machine is designed.

Within the chamber 7 is mounted a plunger 28 shaped to form a close sliding fit with the sides and bottom of the chamber, and having a concave forward face 29 shaped to conform to the arcuate arrangement of the slicing blades 8. The plunger 28 is arranged to be moved within the chamber 7 by means of a pair of drive screws 31 mounted in parallel relation upon opposite sides of the main body 1. The drive screws 31 are journalled at their forward ends in bearings 32 formed in laterally extending portions of the bracket 21. At their rearward ends, the drive screws 31 are journalled in bearings 33 formed in lateral extensions upon the rear wall 4.

The drive screws 31 are connected to the plunger 28 by means of extensions 34 connected to the plunger 28 by neck portions 36 movable along slots 37 formed in the side walls 3 parallel to the drive screws. The extensions 34 are enlarged at their outer ends and are threaded to engage the threads of the drive screws in the manner of a nut movable along the drive screws as the screws are rotated. The half nut engagement, as indicated in Fig. 1 of the drawings, is sufficient for most purposes; but a full nut engagement may be desirable for heavy duty service.

The drive screws 31 are actuated by means of spur gears 38 secured to the drive screws, and are arranged to mesh with a drive gear 39, keyed to the drive shaft 20 and actuated therewith by the hand crank 24, or other driving means for said drive shaft. The drive screws 31 are pitched to advance the plunger 28 toward the cutting blades 8. When the hand crank 24 is turned to rotate the cutter drum 11 and blades 12 in the cutting direction, the plunger 28 is advanced at a rate such that the movement of successive blades 12 past the slicing blades 8 will sever shreds of material of desired thickness from the bulk material pressed past the slicing blades by the advance movement of the plunger 28. The ratio between the drive gear 39 to the gears 38, and between the bevel gears 18 and 19, may be varied through substantial range of limits, to vary the relative rate of axial advance movement of the plunger 28 and rotary movement of the cutter blades 12 to conform to various requirements.

An opening 41 is formed in the bottom plate 2 between the lower ends of the slicing blades 8 and the cross bar 16, and preferably for a further distance between the bar 16 and the front wall 5, so that shreds of material cut by the cutter blades 12 may drop freely through the bottom of the body 1 into a suitable receptacle supported thereunder.

The body 1 may be supported in any convenient manner consistent with the type of service for which it may be designed. As illustrated, the body is supported by legs 40 on which the base plate 2 rests, and which hold the body at a height adequate to receive a suitable receptacle thereunder.

The drive mechanism is preferably enclosed within a suitable housing 42 mounted, over the body 1 and the drive gears and screws, to provide an enclosure therefor. The housing 42 may be of light sheet metal, plastic, or other material, shaped to fit over the mechanism, as illustrated. Preferably the housing is removably attached to the base plate 2 by screws 43 which will permit the housing to be readily removed for cleaning or other purposes. The housing has an opening 44 in the top thereof, over the chamber 7, to permit the introduction of material into the chamber. A cover 46 is provided to fit over the opening 44 to prevent material from being displaced upwardly from the chamber as the plunger is advanced by the drive screws 31.

Figure 6:
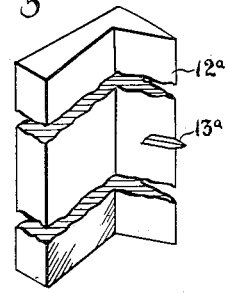
Fig. 6 is a view similar to that shown in Fig. 5 and shows an alternative form of cutter knife.
Figure 7:
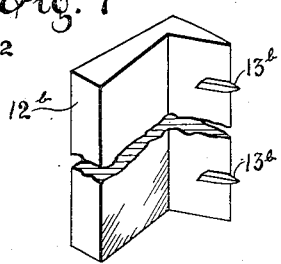
Fig. 7 is a view similar to that shown in Fig. 5 and shows a second alternative form of cutter knife.

In operation, material to be shredded, as for example, vegetables, meat, or other food products, is pressed into the chamber 7 in advance of the plunger 28. As the hand crank 24 is rotated in a clockwise direction, as indicated in the drawings, the plunger 28 will be advanced along the chamber to force the material past the parallel slicing blades 8, thereby causing the material to be severed into thin slices. The thickness of the slices depends upon the spacing of the blades 8, and may be varied by sustituting a blade assembly in which the blades are spaced to satisfy various requirements. At the same time, the cutter drum 11 is rotated to move the cutter blades 12 past the rearward edges of the blades 8. Each blade cuts away whatever amount of material is pressed past the slicing blades 8 between the approach of successive blades 12. In this manner the material is first cut into thin slices of uniform thickness, and strips are then cut from the edges of the advancing slices to form shreds of clean cut and substantially uniform size and length. The blades 12 on the cutter drum are preferably longer than the slicing blades 8 so as to extend slightly above and below the ends of the slicing blades. The blades 12 may be replaced by blades such as 12a (shown in Fig. 6). The blades 12a each has a central projection 13a extending forwardly from the cutting edge thereof and arranged to cut through the material to make shreds one-half the length of the shreds made by the blades 12. Similarly, the blades 12 may be replaced by blades such as 12b (shown in Fig. 7) wherein a plurality of spaced projections 13b are provided at a spacing arranged to cut the shreds into desired lengths according to their spacing. Pressure applied to the cover 46 will hold the material against upward displacement, and insure that the material will be forced past the slicing blades 8. The concave forward face of the plunger 28, conforming to the arcuate arrangement of slicing blades 8, permits the plunger to be advanced to force materials past the blades 8 across the entire width of the chamber as it is moved to its forward limit of movement. Preferably the concave face is surfaced with a layer of soft metal or other material which may be pressed against the slicing blades 8 without material wear or dulling action thereon.

Having thus described my invention, what I claim and desire to secure by Letters Patent is:

A shredding machine comprising a housing forming therein an elongated open-ended chamber having an inner end wall, a plurality of slicing blades mounted along an arc across said chamber remote from said end wall and having cutting edges disposed towards said end wall and shearing edges disposed away from said end wall, a plunger mounted in said chamber intermediate said slicing blades and said end wall for sliding movement axially therebetween and having a concave front face conforming to the arc of said slicing blades, said housing containing a closable opening communicating with said chamber intermediate said end wall and said slicing blades, a rotary cutter mounted within the concavity of the arc formed by the shearing edges of said slicing blades and having a cutter edge thereon parallel to the axis of rotation of said cutter and to the shearing edges of said slicing blades and being of greater length than said slicing blades, means for rotating said rotary cutter in shearing relation to said shearing edges of said slicing blades, said cutting edge having a sharp forwardly extending projection on the front edge thereof, and screw means positively geared to said rotating means and plunger for sliding said plunger through said chamber towards said slicing blades.

References Cited in the file of this patent

UNITED STATES PATENTS

| | | |
|---|---|---|
| 194,370 | Pumphrey | Aug. 21, 1877 |
| 785,599 | Earl | Mar. 21, 1905 |
| 949,929 | Hart | Feb. 22, 1910 |
| 1,322,738 | Tuck | Nov. 25, 1919 |
| 1,735,702 | Williamson | Nov. 12, 1929 |
| 2,242,557 | Urschel et al. | May 20, 1941 |

FOREIGN PATENTS

| | | |
|---|---|---|
| 228,965 | Germany | Nov. 28, 1910 |
| 517,869 | Great Britain | Feb. 12, 1940 |